Dec. 12, 1944.   P. B. BURRUS   2,364,599
ATTACHING MEANS
Filed May 15, 1943

Inventor
Paul B. Burrus
By Henry G. Dyberg
Attorney

Patented Dec. 12, 1944

2,364,599

UNITED STATES PATENT OFFICE 2,364,599

ATTACHING MEANS

Paul B. Burrus, Dayton, Ohio, assignor to American Aircraft Associates, Dayton, Ohio Application May 15, 1943, Serial No. 487,421

4 Claims. (Cl. 287—53)

This invention relates to attaching means and more particularly to means for interconnecting a pair of rotatably mounted members.

In interconnecting or attaching a driving member to a driven member or other rotatably mounted members, it is often desirous to uncouple or detach the members from each other.

An object of this invention is to provide attaching means or coupling means which permit easy assembly of the parts, easy separation thereof, forcibly holding the parts together and forcibly detaching the parts when separating the driving member from the driven member.

Another object of this invention is to provide attaching means for interconnecting a rotatably mounted sleeve member to a shaft member by a fastening member that tightens the members when the fastening member is adjusted in one direction and loosens the members when adjusted in the opposite direction.

Another object of this invention is to provide attaching means that are dependable, efficient and easily produced from parts that may be manufactured by mass production methods, resulting in low cost.

Another object of this invention is to provide means for attaching a generator or motor armature to a shaft, which means permit easy attachment of the armature to the shaft and permit easy and quick removal of the armature from the shaft.

Other objects and advantages reside in the construction of parts, the combination thereof and the mode of operation, as will become more apparent from the following description.

For the purpose of illustration, the coupling unit has been shown applied to a generator driven from an engine shaft.

Figure 1:
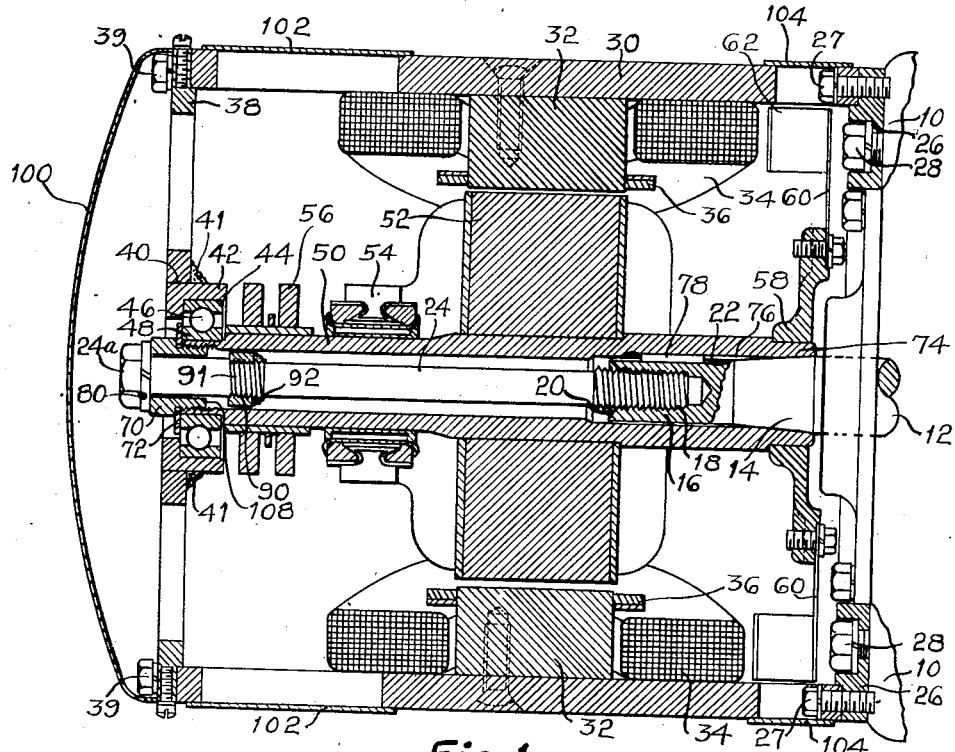

In the drawing, Figure 1 discloses a longitudinal cross sectional view, taken through the center of the generator and showing only a fragmentary portion of the prime mover, which may be a gasoline engine, an electric motor, or any other type of a prime mover.

Figure 2:
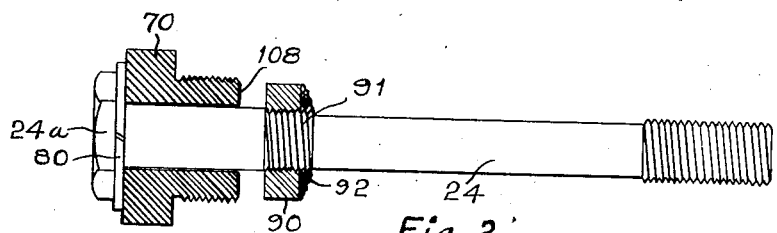

Figure 2 is a detail view of the fastening member, together with an externally threaded collar rotatably mounted upon the fastening member, having the relative longitudinal movement limited.

Referring to the drawing, the reference character 10 is used to indicate a portion of the frame of the prime mover which may be a gasoline engine, a Diesel engine, an electric motor or any other suitable prime mover provided with a drive shaft 12. The drive shaft 12, as it projects from the frame 10, is provided with a tapered portion 14 that merges into a cylindrical portion 16 provided with a threaded bore 18. The end of the cylindrical portion 16 is preferably counterbored at 20 to aid in aligning the retaining member or bolt 24, which is more fully described later. The cylindrical portion 16 is provided with a keyway 22.

The frame portion 10 supports an annular ring 26, held in position on the frame 10 by a plurality of bolts 28, which annular ring is used as a portion of the end frame for the generator that is now to be descried.

The generator includes a cylindrical housing 30 provided with conventional pole pieces 32, windings 34, winding supporting members 36 and an end frame 38 removably mounted on the cylindrical housing 30 by bolts 39. The end frame 38 is made with an annular opening 40 adapted to receive an annular flange member 42, welded in position as shown at 41. Member 42 provides a seat for the outer race 44 for the ball bearing 46, supported on the inner race 48. The inner race 48 is seated upon the outer end of a tubular sleeve 50, supporting the rotor or armature 52 and the commutator 54. In addition to the commutator 54, the tubular sleeve 50 may support a pair of slip rings 56.

The inner end of the tubular sleeve 50 supports a hub 58, having supported thereon a plurality of radially disposed arms 60, each supporting a fan blade 62 for circulating air about the armature. The details of the generator, including the field, the armature, the commutator and the slip rings, have been shown for the purpose of illustration, without forming a part of the invention per se.

The inner end of the tubular sleeve 50 is tapered at 74 and is provided with a key-way 76 cooperating with the key-way 22 to form a key seat for the key 78, causing the tubular sleeve 50 and the parts carried thereby to rotate in unison with the shaft 12. The outer end of the tubular sleeve 50 is provided with internal threads, threadedly engaging a flanged tubular member or collar 70, so as to clamp a washer-like ring 72 against the inner race 48. The sleeve 50 is held in position by the retaining member or bolt 24, having its head 24a exerting a pressure through the lock washer 80 against member 70, as the bolt 24 is threaded into the internal threads 18 of the cylindrical portion 16.

The bolt 24 is provided with an enlarged portion having threads 91. After this portion of the bolt has been threaded, the flanged tubular member 70, which functions as a nut, is inserted upon the bolt 24 as well as the lock washer 80. The collar 90 is then threaded upon the threads 91 and welded into position at 92. The tubular member 70 is restricted in the longitudinal movement on the bolt 24 by the collar 90 in one direction and by the lock washer 80 engaging the head 24a in the opposite direction. The bolt 24, supporting the collar 90, the flanged tubular member 70, the lock washer 80 and the washer-like ring 72, is then positioned in the center of the tubular sleeve 50 and the flanged tubular member 70 threaded into position with respect to the tubular sleeve 50. As the flanged tubular member 70 is tightened, the washer-like ring 72 clamps the inner race 48 rigidly against a shoulder on the tubular sleeve 50. The bolt 24 is then loosely positioned in the center of the armature, which may be positioned upon the end of the shaft 12, as already described above.

In the event it is found necessary to remove the armature from the shaft 12, it is merely necessary to unscrew the bolt 24. As the bolt 24 is unscrewed, the collar 90 eventually engages the inner surface 108 of the tubular member 70 threadedly engaging the tubular sleeve 50, so as to force the sleeve 50 out of engagement with the conical tapered portion 14 of the shaft 12. By this arrangement, it is possible to provide positive means for withdrawing the armature from the end of the shaft 12. Obviously, the armature could not be completely removed without unscrewing the screws 27 holding the shell 30 in engagement with the annular ring 26. When the parts are to be assembled, it is merely necessary to position the tubular sleeve 50 in proper relation with respect to the end of the shaft, align the bolt 24 with the hole in the end of the shaft 12 and tighten the bolt, causing the parts to be self-aligned and clamped in position.

Suitable shields 100, 102 and 104 are used in enclosing the generator parts. These shields cooperate with the cylindrical shell or housing 30 to form a closed housing for the generator.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Means for interconnecting a pair of rotating parts, said means including a shaft having a tapered portion merging into a cylindrical portion, which cylindrical portion is provided with a threaded bore, a tubular sleeve provided with a tapered end engaging the tapered portion of the shaft, a collar fixedly attached to the tubular sleeve, said collar forming a pair of shoulders, and retaining means extending through the collar and the tubular sleeve, said retaining means terminating in a threaded end threadedly engaging the threaded bore in the end of the shaft, said retaining means including a pair of collars cooperating to form an annular peripherally disposed channel portion receiving the first mentioned collar, so that as the retaining means is tightened one shoulder of the channel engages one shoulder of the collar and as the retaining means is loosened another shoulder of the channel engages the opposite shoulder of the collar so as to cooperate therewith to rigidly hold the parts together when the retaining means is tightened and to positively separate the parts when the retaining means is loosened.

2. Means for interconnecting a pair of rotating parts, said means including a shaft having a tapered portion provided with a key slot, the end of the shaft being provided with a threaded bore, a tubular sleeve provided with an internal taper adjacent one end, which taper engages the tapered portion of the shaft, an internally disposed key slot in the tapered portion of the tubular sleeve registering with the key slot in the shaft so as to form a key seat, a key positioned in the key seat, and retaining means extending into the tubular sleeve and terminating in a threaded portion threadedly engaging the tubular bore in the end of the shaft, said retaining means including a portion fixedly attached to the sleeve and another portion having a limited movement with respect to the tubular sleeve so that as the retaining means is tightened the tubular sleeve is rigidly held in engagement with the end of the shaft and so that as the retaining means is loosened the tubular sleeve is forcibly removed from the end of the shaft.

3. Means for interconnecting a pair of rotating parts, said means including a shaft having an enlarged portion arranged in spaced relation from the end of the shaft, the end of the shaft being provided with a threaded bore, a tubular member having a portion adapted to engage the enlarged portion of the shaft, said tubular member being provided with inwardly projecting means, and retaining means terminating in a threaded portion threadedly engaging the threaded bore in the end of the shaft, said retaining means including outwardly directed means engaging the inwardly projecting means of the tubular member so as to cause the tubular member to be moved axially in response to the tightening or loosening of the retaining means to positively move the tubular member when the retaining means is adjusted.

4. Mechanism for interconnecting a pair of rotating parts, said mechanism including a shaft having a tapered portion near one end, which end is provided with an internally threaded bore, a tubular sleeve provided with a tapered portion near one end thereof, said tapered portion engaging the tapered portion of the shaft, means for rotatably supporting the shaft, a bearing for supporting the end of the tubular sleeve opposite the end adjacent the taper, means for supporting the bearing in fixed relation with respect to the shaft supporting means, and retaining means engaging the shaft, said retaining means terminating in a threaded end threadedly engaging the threaded bore in the end of said shaft, said retaining means when tightened clamping the tubular sleeve in engagement with the shaft.

PAUL B. BURRUS.